(12) United States Patent
Wu

(10) Patent No.: US 7,702,297 B2
(45) Date of Patent: Apr. 20, 2010

(54) MOBILE COMMUNICATION DEVICE CAPABLE OF LEANING

(75) Inventor: Tsung-Yao Wu, Taipei (TW)

(73) Assignee: Inventec Appliances Corp., Taipei (TW)

( * ) Notice: Subject to any disclaimer, the term of this patent is extended or adjusted under 35 U.S.C. 154(b) by 912 days.

(21) Appl. No.: 11/471,515

(22) Filed: Jun. 21, 2006

(65) Prior Publication Data

US 2006/0287017 A1 Dec. 21, 2006

(30) Foreign Application Priority Data

Jun. 21, 2005 (TW) .............................. 94120668 A

(51) Int. Cl.
*H04B 1/38* (2006.01)
(52) U.S. Cl. .................. 455/90.3; 455/575.1; 455/566; 455/550.1; 455/575.7; 455/575.4; 379/433.09
(58) Field of Classification Search ............... 455/90.3, 455/575.1, 566, 550.1, 575.7, 575.4; 379/433.09
See application file for complete search history.

(56) References Cited

U.S. PATENT DOCUMENTS 6,215,870 B1 * 4/2001 Hirai et al. .................. 379/446
6,339,699 B1 * 1/2002 Hirai et al. ................ 455/575.1
6,785,562 B2 * 8/2004 Lee et al. ..................... 455/566
7,043,276 B2 * 5/2006 Kokubo ....................... 455/566
7,119,843 B2 * 10/2006 Terasaki et al. ............. 348/373
7,146,195 B2 * 12/2006 Sudo et al. ................ 455/575.1
7,194,087 B2 * 3/2007 Luginbill et al. ............ 379/455
7,221,914 B2 * 5/2007 Ho et al. .................... 455/90.3
7,283,852 B2 * 10/2007 Fagerstrom et al. ....... 455/575.1
7,400,902 B2 * 7/2008 Jeon ........................ 455/550.1
7,463,911 B2 * 12/2008 Tseng et al. ............. 455/575.1
7,500,866 B2 * 3/2009 Gennai et al. ............... 439/367

* cited by examiner

*Primary Examiner*—Marceau Milord
(74) *Attorney, Agent, or Firm*—Birch, Stewart, Kolasch & Birch, LLP

(57) ABSTRACT

A mobile phone includes a main body consisting of front and rear side parts; a retention groove formed in the rear side part and having pivotal holes; and a prop kept within the retention groove in the rear side part. The prop has two positioning posts pivotally inserted into the pivotal holes in the rear side part. The prop is turnable relative to the rear side part between a normal position where the prop is pressed into the retention groove, and an extended position where the prop is spaced apart from the rear side part to form an angle. Movement of the prop between the normal position and the extended position results in engagement between the positioning posts and the pivotal holes so as to permit leaning of the main body on the prop.

14 Claims, 6 Drawing Sheets

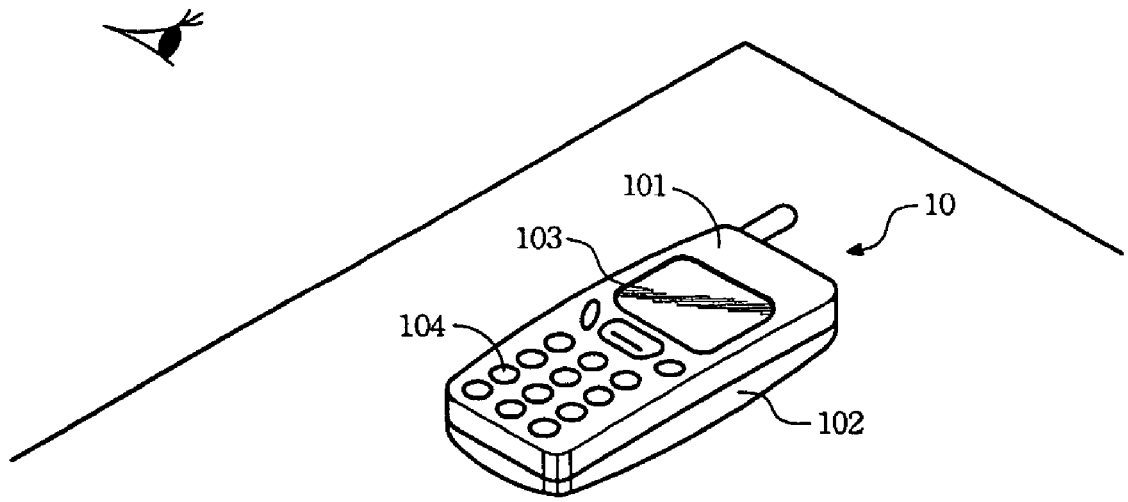
Fig. 1 (Prior Art)
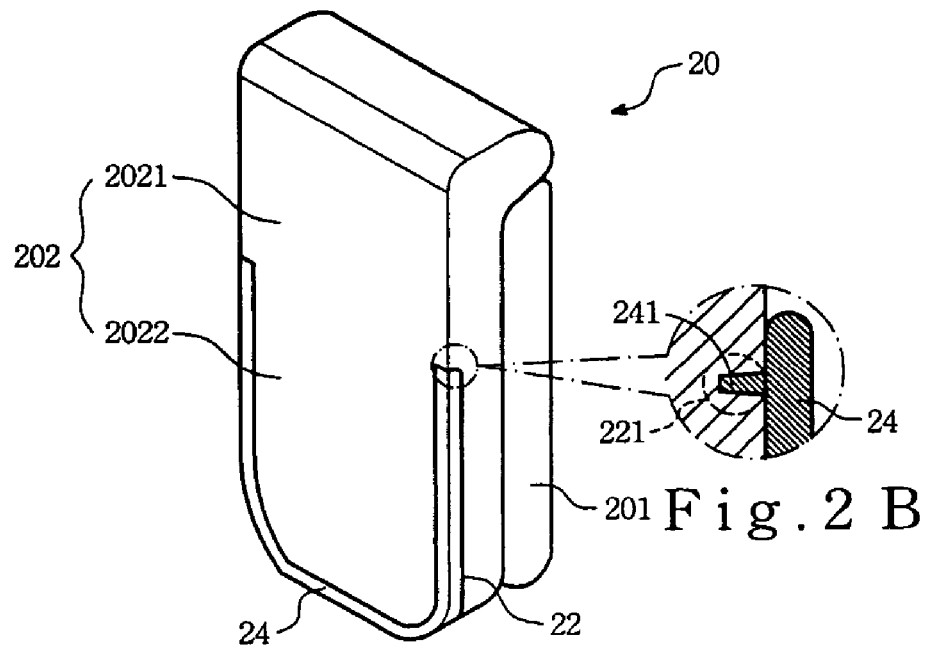
Fig. 2 A
Fig. 2 B

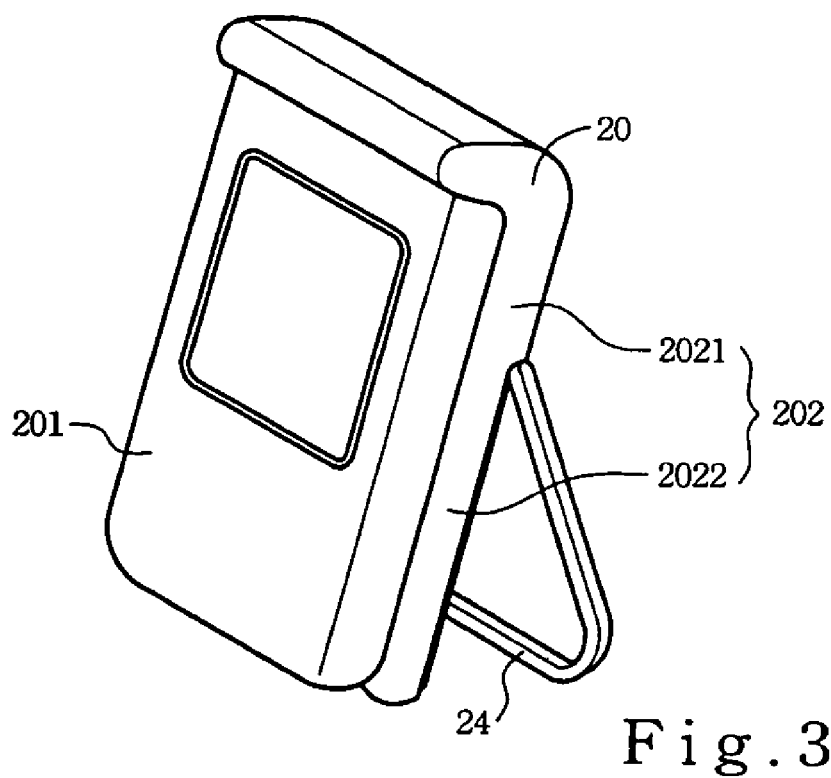
Fig.3 A
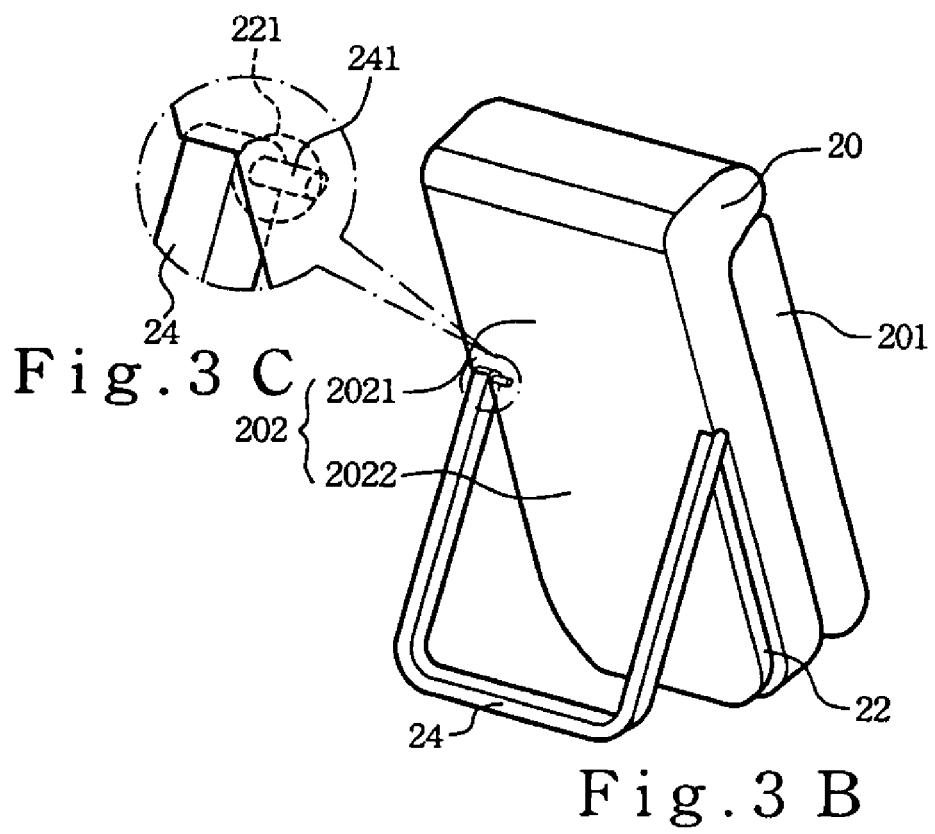
Fig.3 C
Fig.3 B

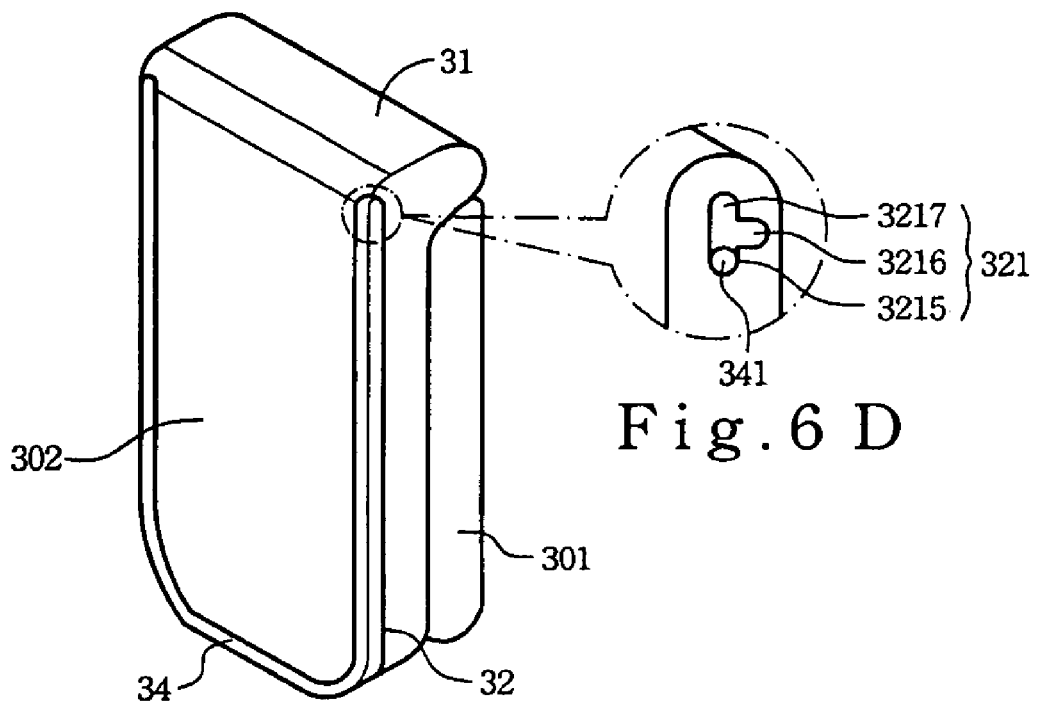
Fig. 6 D
Fig. 6 A
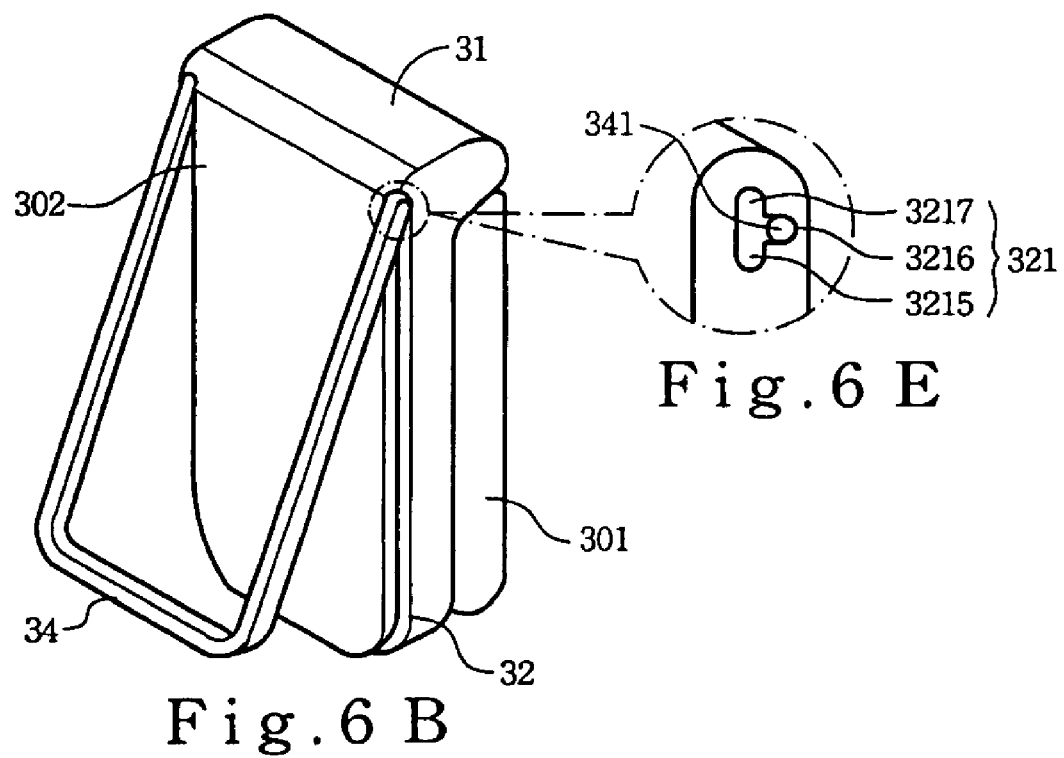
Fig. 6 E
Fig. 6 B

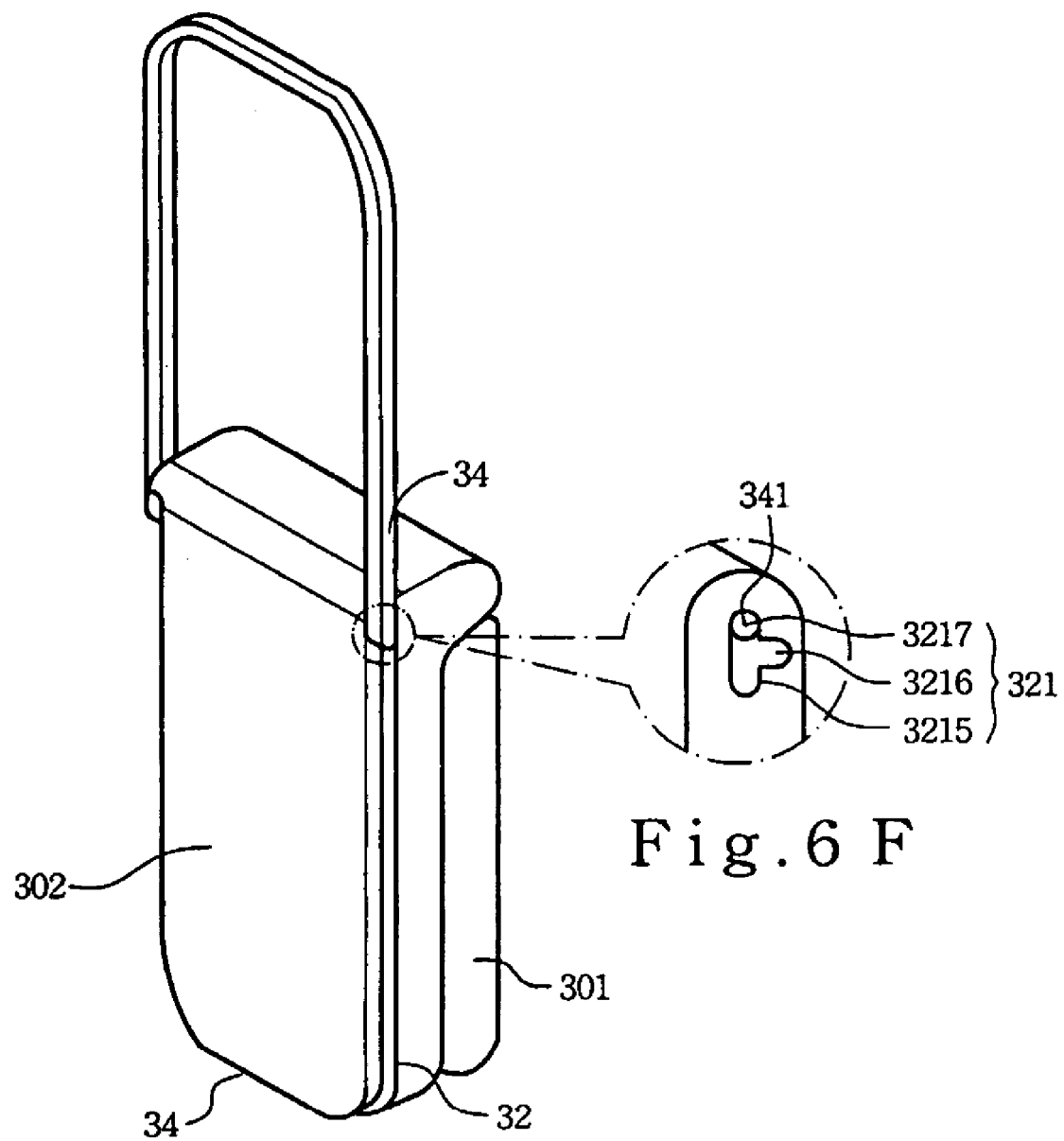

MOBILE COMMUNICATION DEVICE CAPABLE OF LEANING

FIELD OF THE INVENTION

The invention relates to a mobile communication device, and more particularly to the mobile communication device, such as a mobile phone which is capable of leaning to facilitate the application of the mobile phone.

BACKGROUND OF THE INVENTION

In order to promote and achieve the fame in the brand of an electronic communication instrument, the manufacturers have invented a plurality of auxiliary devices to facilitate the application of a mobile communication device since that it is prevalent and is widely used among the people. The auxiliary devices include the multi-media, the wireless network and electronic games that are all equipped to the mobile communication device to satisfy the user. In addition to the auxiliary devices, the external appearance of the mobile communication device also plays an important part in order to attract the attention of the users.

Since the trend of the market is to produce the mobile communication device in compact size, there arises some drawbacks when the mobile communication device is placed on a table. For example, it is difficult to locate the presence of the mobile communication at an eye glance due to its compact size.

FIG. 1 shows a conventional mobile communication device (hence will be called a mobile phone). The conventional mobile phone includes a main body 10 consisting of a front side part 101 and a rear side part 102 opposite to the front side part 101. The front side part 101 has a display 103 and a keypad 104. When the conventional mobile phone is disposed on a table, the display 103 provides a relatively small viewing angle, such as 135. In case, the user is out of range of the viewing angle, the user is unable to see the display 103 clearly. Thus, the user is disposed in a state, where he or she is unable to identify clearly the calling number or the time. To overcome the aforesaid drawback, the user must adjust manually the location of the conventional mobile phone.

A phone rest is generally employed in order to keep the conventional mobile phone thereon. However, it is inconvenient to carry the phone rest along with the user. Purchase of the phone rest can result in extra expense for the user of the mobile phone.

For a mobile phone with a camera, a camera stand is offered together with the mobile phone during the purchase so as to attract the attention of the consumers. It is noted that the structure of the camera stand is similar to that of the conventional camera stand and must be carried separately with respect to the mobile phone, thereby causing inconvenience to the consumer.

It is therefore important for the phone manufactures to find a way to eliminate the aforesaid problem encountered during use of the conventional mobile phone.

SUMMARY OF THE INVENTION

It is the object of the present invention to provide a mobile phone which is capable of leaning to facilitate the application of the mobile phone in case circumstance required.

In one aspect of the present invention, a mobile communication device which includes a main body consisting of a front side part and a rear side part is provided; a retention groove formed along a periphery of the rear side part, and has a pair of pivotal holes formed respectively on two ends; and a prop capable of being kept within the retention groove in the rear side part. The prop has a pair of positioning posts stretching respectively from two end portions of the prop, and the pair of positioning posts pivotally inserted into said pair of pivotal holes respectively in the rear side part. The support leg is turnable relative to the rear side part between a normal position where the prop has been pressed into the retention groove, and an extended position where the prop has been spaced apart from the rear side part to form an angle therebetween. Movement of the prop from the normal position to the extended position results in engagement between the pair of positioning posts and the pair of pivotal holes in the rear side part so as to permit leaning of the main body on the prop.

BRIEF DESCRIPTION OF THE DRAWINGS

Other features and advantages of this invention will become more apparent in the following detailed description of the preferred embodiment of this invention, with reference to the accompanying drawings, in which:

FIG. 1 is a perspective view of a conventional mobile communication device when it is disposed on a table;

FIG. 2A is a perspective and side view of mobile communication device according to the present invention in a normal position;

FIG. 2B is an enlarged view of an encircled portion of the mobile communication device shown in FIG. 2A;

FIG. 3A shows a front side view of the mobile communication device of the present invention in an extended position;

FIG. 3B shows a rear side view of the mobile communication device of the present invention in the extended position;

FIG. 3C is an enlarged view of an encircled portion of the mobile communication device shown in FIG. 3B;

FIG. 6A is rear side view of the mobile communication device of the present invention in the normal position, illustrating how still another embodiment of the prop is kept in the retention groove;

FIG. 6B is rear side view of the mobile communication device of the present invention in the extended position, illustrating how still another embodiment of the prop is spaced apart from the retention groove;

FIG. 6C is rear side view of the mobile communication device of the present invention in the extended position, illustrating how still another embodiment of the prop is spaced apart from the retention groove;

FIG. 6D is an enlarged view of an encircled portion of the mobile communication device shown in FIG. 6A;

FIG. 6E is an enlarged view of an encircled portion of the mobile communication device shown in FIG. 6B;

FIG. 6F is an enlarged view of an encircled portion of the mobile communication device shown in FIG. 6C;

DETAILED DESCRIPTIONS OF THE PREFERRED EMBODIMENTS

Figure 4:
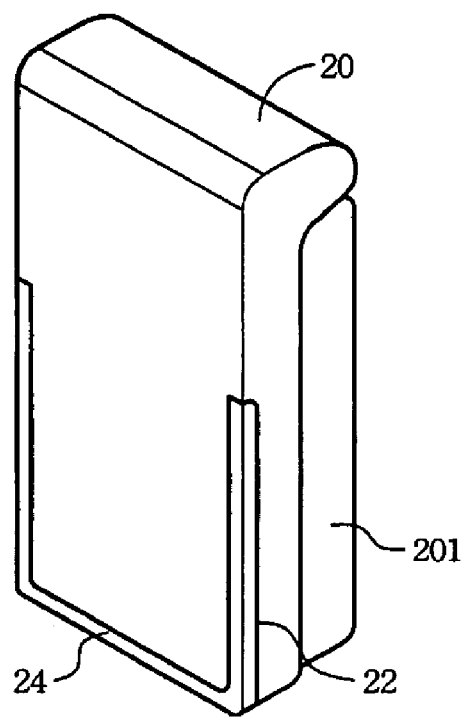
FIG. 4 is rear side view of the mobile communication device of the present invention in the normal position, illustrating how one embodiment of a prop is kept in a retention groove.

FIGS. 2A to 3C, a mobile communication device (hence will be called a mobile phone) of the present invention is shown to include a main body 2, a retention groove 22, and a prop 24.

As illustrated, the main body 20 includes a front side part 201 and a rear side part 202. The said rear side part 202 has an upper portion 2021 and a lower portion 2022. The retention groove 22 is formed on an outer surface of the lower portion 2022 of the rear side part 202 along the periphery thereof. The prop 24 is kept within the retention groove 22 in the rear side part 202 in a normal position. The front side part 201 may include an operating panel, such as a keypad, and a display, such as a liquid crystal display (LCD).

The retention groove 22 in the rear side part 202 is confined by a groove-defining wall having a pair of pivotal holes 221 formed respectively on two ends of the retention groove (see FIG. 2B). The prop 24 has two end portions and a pair of positioning posts 241 stretching respectively from the two end portions, and the pair of positioning posts pivotally are inserted into said pair of pivotal holes 221 respectively in the rear side part 202 (see FIG. 2B). Under this condition, the prop 24 is turnable relative to the rear side part 202 between a normal position (see FIG. 2A) where the prop 24 has been pressed into said retention groove 22 in the rear side part 202, and an extended position (see FIGS. 3A and 3B) where the prop 24 is spaced apart from the rear side part 202 to form a predetermined angle therebetween. The predetermined angle can be arranged according to the requirement of the user, such as from 0.0 to 90.0 or from 0.0 to 180.0.

Therefore, movement of the prop 24 from the normal position to the extended position by pulling action of the user results in engagement between the pair of positioning posts 241 and the pair of pivotal holes 221 so as to permit leaning of the main body 20 on the prop (see FIGS. 3A and 3B). Each of the positioning posts 241 is circular in cross-section, and has a tapered end with a dimension to be suitably inserted into respective one of the pivotal holes 221 in such a manner that the engagement between the pair of positioning posts 241 and the pair of pivotal holes 221 produces a friction to permit leaning of the prop 24 in the extended position. Each of the pivotal holes 221 in the rear side part 202 is circular in cross-section so as to match the dimension of the positioning post 241.

Referring to FIGS. 3A to 4, one embodiment of the prop 24 employed in the mobile phone of the present invention is shown and is shaped like U. The retention groove 22 in the rear side part 202 has a shape matching the U-shaped prop 24 in order to be able to keep said prop 24 within said retention groove 22.

Figure 5:
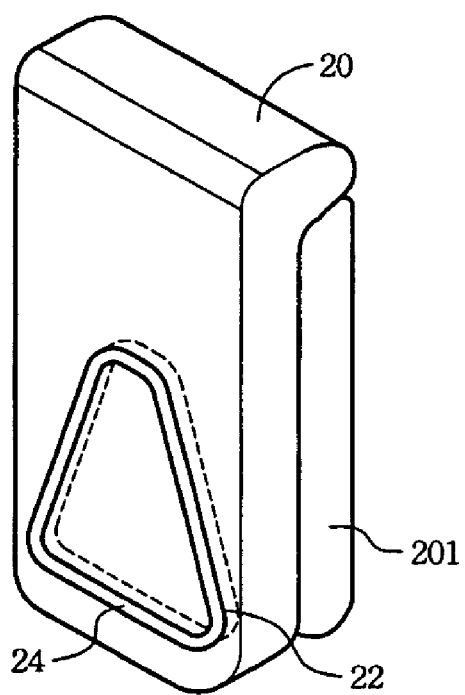
FIG. 5 is rear side view of the mobile communication device of the present invention in the normal position, illustrating how another embodiment of the prop is kept in the retention groove.

FIG. 5 is rear side view of the mobile communication device of the present invention in the normal position, illustrating how another embodiment of the prop 24 is kept fittingly in the retention groove 22. The only difference from the previous embodiment is that the prop 24 is shaped like a triangle while the retention groove 22 in the outer surface of the rear side part 202 has a shape matching the triangular prop 24 in order to be able to keep the prop 24 within the retention groove 22.

FIGS. 6A to 6C show a rear side view of the mobile communication device of the present invention in the normal position and extended position, wherein each of the pivotal holes 321 in the rear side part 302 is shaped like T, and has a front hole section 3216 and a rear hole section 3217 that is disposed behind and is integrated with the front hole section 3216 and that has a cross section wider than the front hole section 3216. When the prop 34 is in the normal position, as best shown in FIG. 6D, the positioning posts 341 lean at the bottom ends 3215 of the pivotal holes 321. The prop 34 can be manually moved to the extended position, where the positioning posts 341 of the prop 34 engage the front hole sections 3216 so as to permit leaning of the main body in the extended position as best shown in FIG. 6B. On the other hand, the prop 34 can be turned relative to the rear side part 302 to another extended position to define 180.0 between the prop 34 and the rear side part 302, where the prop 34 is generally flushed with the rear side part 302 (see FIG. 6C) and, where the positioning posts 341 engage the top ends of the rear hole sections 3217 (see FIG. 6F) to permit dangling of the main body. Under this condition, the prop 34 can be hung on a wall peg to permit the user to view the display or the time clearly.

Figure 7:
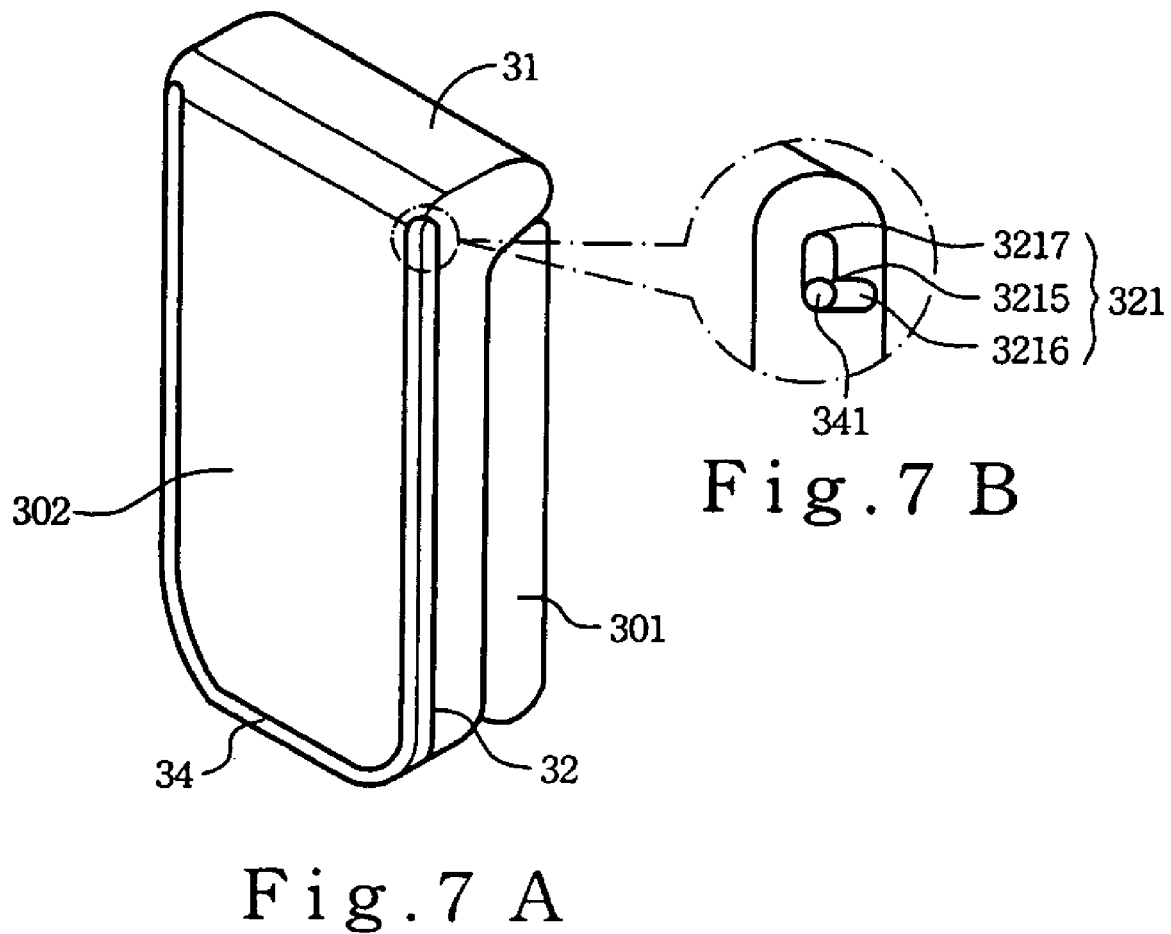
FIG. 7A is rear side view of the mobile communication device of the present invention in the normal position.
FIG. 7B is an enlarged view of an encircled portion of the mobile communication device shown in FIG. 7A.

FIG. 7A shows a rear side view of still another embodiment of the mobile communication device of the present invention having the same structure similar to that shown in FIG. 6A. The only difference in that each of the pivotal holes 321 in the rear side part 302 is generally L-shaped, and has a horizontal hole section 3216 and a vertical hole section 3217 that extends integrally from the horizontal hole section 3216 and that has a longitudinal length greater than that of the horizontal hole section 3216. When the main body is disposed in the normal position, the positioning posts 341 of the prop 34 lean at the intersection points 3215 of the horizontal and vertical hole section 3216, 3217 (see FIG. 7B).

The following advantages can be achieved when the mobile phone of the present invention is used.

(1) When the prop is implemented onto one side part of the mobile phone of the present invention, the latter can be disposed in either the normal or extended position. Since the present mobile phone can be disposed on the table in the extended position, the user, thereby eliminating the problem of being unable to locate the mobile phone at once glance, can easily locate it.

(2) The display of the present mobile phone in the extended position can be viewed easily by virtue of the prop so that the user can instantly know the number of income call as well as the real time. Therefore, unlike the conventional mobile phone, the user can avoid the drawback of manually adjusting the position of the main body as encountered during use of the conventional mobile phone.

(3) Since there is no phone rest required for disposing the present mobile phone in the normal or extended position, it is not necessary to purchase the phone rest. No additional expense will be produced when the user choose the present mobile phone. The user can easily take the present mobile phone along with him. Moreover, the user can easily take the present mobile phone along with him.

(4) For the user of the conventional mobile phone, he or she must purchase a stand in case the conventional mobile phone has ability to photography. However, in case the present mobile phone is provided with the ability to photography, the user does not need to buy the stand, since the main body of the present mobile phone can be disposed at any desired angle with the assistance of the prop for taking pictures.

While the present invention has been described in connection with what is considered the most practical and preferred embodiments, it is understood that this invention is not limited to the disclosed embodiments but is intended to cover various arrangements included within the spirit and scope of the broadest interpretation so as to encompass all such modifications and equivalent arrangements.

What is claimed is:

1. A mobile communication device capable of leaning, comprising:

a main body including a front side part and a rear side part;

a retention groove formed along a periphery of said rear side part and having a pair of pivotal holes formed respectively on two ends of the retention groove; and a prop capable of being kept within said retention groove in said rear side part and having a pair of positioning posts stretching respectively from two end portions of the prop, and the pair of positioning posts pivotally inserted into said pair of pivotal holes respectively;

wherein said prop is turnable relative to said rear side part between a normal position where said prop has been pressed into said retention groove, and an extended position where said prop has been spaced apart from said rear side part to form an angle therebetween, and wherein movement of said prop between said normal position and said extended position results in engagement between said pair of positioning posts and said pair of pivotal holes so as to permit leaning of said main body on said prop.

2. The mobile communication device according to claim 1, wherein said rear side part has an upper portion and a lower portion, said retention groove being formed on a surface of said lower portion.

3. The mobile communication device according to claim 2, wherein said front side part includes an operating panel.

4. The mobile communication device according to claim 2, wherein said front side part includes a display.

5. The mobile communication device according to claim 2, wherein said prop is shaped like U and said retention groove has a shape matching said U-shaped prop in order to be able to keep said prop within said retention groove.

6. The mobile communication device according to claim 2, wherein said prop is shaped like a triangle, and said retention groove has a shape matching said triangular prop in order to be able to keep said prop within said retention groove.

7. The mobile communication device according to claim 2, wherein each of said pair of pivotal holes in said rear side part is circular in cross-section, each of said pair of positioning posts being circular in cross-section and having a dimension to be suitably inserted into respective one of said pair of pivotal holes in such a manner that engagement between said pair of positioning posts and said pair of pivotal holes produces friction to fix said prop between said normal position and said extended position.

8. The mobile communication device according to claim 2, wherein said angle formed between said prop and said rear side part ranges from 0° to 90°.

9. The mobile communication device according to claim 1, wherein said retention groove is formed on an edge of an outer surface of said rear side part along the periphery thereof.

10. The mobile communication device according to claim 9, wherein said front side part includes an operating panel.

11. The mobile communication device according to claim 9, wherein said front side part includes a display.

12. The mobile communication device according to claim 9, wherein each of said pair of pivotal holes has a front hole section and a rear hole section, that is disposed behind and integrated with said front hole section.

13. The mobile communication device according to claim 9, wherein each of said pair of pivotal holes has a horizontal hole section and a vertical hole section, that extends integrally from said horizontal hole section.

14. The mobile communication device according to claim 9, wherein said angle formed between said prop and said rear side part ranges from 0° to 180°.

* * * * *